United States Patent
Jung et al.

(10) Patent No.: US 12,412,890 B2
(45) Date of Patent: Sep. 9, 2025

(54) NEGATIVE ELECTRODE ACTIVE MATERIAL FOR LEAD STORAGE BATTERY AND Pb/C BATTERY, PREPARATION METHOD THEREFOR, AND LEAD STORAGE BATTERY AND Pb/C BATTERY COMPRISING NEGATIVE ELECTRODE ACTIVE MATERIAL

(71) Applicant: INDUSTRY FOUNDATION OF CHONNAM NATIONAL UNIVERSITY, Gwangju (KR)

(72) Inventors: Ho Young Jung, Gwangju (KR); Sadhasivam Thangarasu, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 779 days.

(21) Appl. No.: 17/774,221

(22) PCT Filed: Nov. 6, 2020

(86) PCT No.: PCT/KR2020/015549
§ 371 (c)(1),
(2) Date: May 4, 2022

(87) PCT Pub. No.: WO2021/091325
PCT Pub. Date: May 14, 2021

(65) Prior Publication Data
US 2023/0054947 A1    Feb. 23, 2023

(30) Foreign Application Priority Data
Nov. 8, 2019  (KR) .................. 10-2019-0142774

(51) Int. Cl.
*H01M 4/36*    (2006.01)
*H01M 4/38*    (2006.01)
(Continued)

(52) U.S. Cl.
CPC ............. *H01M 4/364* (2013.01); *H01M 4/38* (2013.01); *H01M 4/583* (2013.01); *H01M 2004/021* (2013.01); *H01M 2004/027* (2013.01)

(58) Field of Classification Search
CPC ...... H01M 4/362; H01M 4/364; H01M 4/366; H01M 4/583; H01M 4/133; H01M 4/1393;
(Continued)

(56) References Cited

FOREIGN PATENT DOCUMENTS

| CN | 108777289 A | 11/2018 |
|----|-------------|---------|
| CN | 109698343 A | 4/2019 |

(Continued)

OTHER PUBLICATIONS

CN 109698343 English translation. Peng et al. China. Apr. 30, 2019. (Year: 2019).*

(Continued)

*Primary Examiner* — Christopher P Domone
(74) *Attorney, Agent, or Firm* — The PL Law Group, PLLC (57) ABSTRACT

A negative electrode active material for a lead storage battery or a Pb/C battery according to an embodiment includes a porous carbon material having a plurality of pores and a lead nanoparticle formed in the pores. The material may be capable of controlling the crystal size of lead sulfate produced at a negative electrode during discharging of a lead storage battery and a Pb/C battery.

10 Claims, 8 Drawing Sheets

(51) Int. Cl.
*H01M 4/583* (2010.01)
*H01M 4/02* (2006.01)

(58) Field of Classification Search
CPC ........ H01M 4/625; H01M 4/663; H01M 4/14;
H01M 4/16; H01M 4/22; H01M 4/56;
H01M 4/57; H01M 4/68; H01M 4/82;
H01M 10/06; H01M 10/20
See application file for complete search history.

(56) References Cited

FOREIGN PATENT DOCUMENTS

JP          2017-162754 A      9/2017
KR     10-2018-0049607 A      5/2018

OTHER PUBLICATIONS

International Search Report for PCT/KR2020/015549 mailed on Mar. 9, 2021.
Leying Wang et al., "Tracking the morphology evolution of nano-lead electrodeposits on the internal surface of porous carbon and its influence on lead-carbon batteries", Electrochimica Acta, Dec. 20, 2016, vol. 222, pp. 376-384, Elsevier, Amsterdam.

* cited by examiner

NEGATIVE ELECTRODE ACTIVE MATERIAL FOR LEAD STORAGE BATTERY AND Pb/C BATTERY, PREPARATION METHOD THEREFOR, AND LEAD STORAGE BATTERY AND Pb/C BATTERY COMPRISING NEGATIVE ELECTRODE ACTIVE MATERIAL

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/015549, filed Nov. 6, 2020, which claims priority to the benefit of Korean Patent Application No. 10-2019-0142774 filed in the Korean Intellectual Property Office on Nov. 8, 2019, the entire contents of which are incorporated herein by reference.

BACKGROUND

1. Technical Field

The present disclosure relates to a negative electrode active material for a lead storage battery and a Pb/C battery and a method for preparing the same. More specifically, the present disclosure relates to a negative electrode active material for a lead storage battery and a Pb/C battery, in which the material is capable of controlling the crystal size of lead sulfate produced at a negative electrode during discharging of a lead storage battery and a Pb/C battery, and a method preparing the same, and a lead storage battery and a Pb/C battery including the negative electrode active material.

2. Background Art

Lead storage battery systems are mainly applied to automobiles because of their low cost and excellent safety. A lead storage battery, which is a typical secondary battery, uses lead as a negative electrode and lead having lead oxide on its surface as a positive electrode and has a structure in which the electrode is immersed in dilute sulfuric acid. When the lead storage battery is discharged, lead (Pb) on the surface of the negative electrode reacts with sulfate ions to become lead sulfate ($PbSO_4$) and emits electrons. After receiving these electrons, lead oxide ($PbO_2$) on the surface of the positive electrode reacts with sulfuric acid to become lead sulfate. Through this reaction, current flows into the lead storage battery. When charging a lead storage battery, the reverse reaction occurs during discharging. Accordingly, the secondary battery has the advantage that it can be used for a long time by repeating charging and discharging.

However, when discharging a conventional lead storage battery, the lead sulfate is precipitated as particles in the active material at the positive and negative electrodes and has low solubility, and thus grows into a crystalline state, and thus may not be used due to gradual loss of activity. This is a factor that degrades performance during partial charging as the cycle progresses, and in particular, lead sulfate formed in the negative electrode has a significant effect.

Meanwhile, an electrical double layer capacitor (EDLC) with an excellent charge/discharge cycle is under development as an alternative to lead storage batteries, but low energy density and high price are a problem.

The Pb/C battery is a secondary battery system using a negative electrode prepared by coating a carbon active material with a binder (PTFE, CMC, etc.) on a grid composed of lead components to overcome the disadvantages of the lead storage battery. In general, sulfuric acid is used as the electrolyte in a Pb/C battery. The positive electrode is a lead dioxide electrode like the positive electrode of a lead storage battery, and the negative electrode uses a capacitor electrode using activated carbon, so the electrode reaction occurring at both electrodes is as follows.

A positive electrode:

A negative electrode:

Overall reaction:

Here, $C_s$ is a carbon atom on the electrode surface, // means a double layer of charges accumulated in each layer, and proton, which is a hydrogen cation derived from acid, is accumulated in the electrode surface layer of the electrode composed of active carbon having a very high surface area (1500 $m^2$/g). That is, in the battery-type lead dioxide electrode, during charging and discharging, and charges move through a faradaic process to oxidize and reduce, while in the capacitor-operated carbon electrode, charges accumulate or emit in a non-faradaic process in the double layer.

However, the Pb/C battery known so far also has problems due to a change in the volume of the electrode active material, such as a pulsation phenomenon due to the generated $PbSO_4$ as well as a hydrogen gas generated by electrochemical reaction (oxidation/reduction reaction) occurring during cell operation spreads between electrodes. That is, the larger crystal formation of $PbSO_4$ in the negative electrode limits the long-life performance of the lead storage battery system.

Therefore, there is a need for a novel electrode material and preparation method that can control the crystal size growth during lead sulfate production.

SUMMARY

The present inventors have completed the present disclosure by developing a technique for effectively controlling the crystal growth of lead sulfate formed during discharge in a lead storage battery as a result of numerous studies.

Accordingly, an objective of the present disclosure is to effectively control the crystal size of lead sulfate produced during the discharge of lead storage battery and Pb/C battery to provide a negative electrode active material for a lead storage battery and a Pb/C battery, and a method of preparing the same, which provides an increased Faraday electrochemical process.

Another objective of the present disclosure is to provide a negative electrode for a lead storage battery and a Pb/C battery that can realize a high-rate partial state of charge (HRPSoC) and high-capacity performance during long-term operation, further improve charge-discharge capacity performance, and provide long-life performance and a lead storage battery and a Pb/C battery including the negative electrode.

The objective of the present disclosure is not limited to the objective mentioned above, and even if not explicitly mentioned, an objective of the present disclosure that may be recognized by those skilled in the art from the detailed description of the present disclosure may be naturally included.

In order to achieve the above objective of the present disclosure, the present disclosure provides a negative electrode active material for a lead storage battery and a Pb/C battery. The negative electrode active material includes: porous carbon material having a plurality of pores; and lead nanoparticles formed in the pores.

In a preferred embodiment, the porous carbon material is an activated carbon or carbon nanotubes.

In a preferred embodiment, the porous carbon material is obtained by activation with KOH, NaOH, or both at a temperature of 100° C. to 3000° C. and then carbonizing the activated raw material at a temperature of 300° C. to 900° C.

In a preferred embodiment, the porous carbon material and the lead nanoparticles are included in a weight ratio of 100:0 to 50:50.

In a preferred embodiment, the lead nanoparticles have a size of 1 to 1000 nm and are uniformly supported on the porous carbon material.

In addition, the present disclosure provides a method for preparing a negative electrode active material for a lead storage battery and a Pb/C battery, the method includes: preparing a carbon material dispersion solution by putting porous carbon material having multiple pores in a solvent and dispersing the same; impregnating the pores of the carbon material with a lead precursor by adding a lead precursor to the carbon material dispersion solution; obtaining a negative electrode active material by reducing the impregnated lead precursor to form lead nanoparticles in the pores of the carbon material; and washing and drying the negative electrode active material.

In a preferred embodiment, the impregnating includes: adding dropwise a certain amount of a lead precursor to the dispersion solution while primarily treating the carbon material dispersion solution with a stirrer and ultrasonic waves; and obtaining a precursor solution by secondarily treating the dispersion solution in which the dropwise adding of the lead precursor is completed with a stirrer and ultrasonic waves.

In a preferred embodiment, obtaining the negative electrode active material includes: cooling the precursor solution obtained in the impregnation step to 0° C. to 10° C.; adding a reducing agent to the cooled precursor solution; heating and stirring the precursor solution to which the reducing agent is added; cooling the heated precursor solution to room temperature and then tertiarily treating the precursor solution with a stirrer and ultrasonic waves; and maintaining and fixing the precursor solution tertiarily treated with a stirrer and ultrasonic waves at room temperature for a certain period of time.

In a preferred embodiment, the fixing is performed at room temperature, atmospheric pressure, or vacuum conditions.

In a preferred embodiment, the lead precursor is any one selected from the group consisting of lead nitrate ($Pb(NO_3)_2$), lead sulfate ($PbSO_4$), lead chloride ($PbCl_2$), lead acetate ($Pb(CH_3COO)_2$), lead chromate ($Pb(CrO_4)$), lead bromide ($PbBr_2$), and lead iodide ($PbI_2$).

In a preferred embodiment, the porous carbon material is activated carbon or carbon nanotubes obtained by activating any one among KOH, NaOH, and a combination thereof at a temperature of 100° C. to 3000° C. and then carbonizing the same at a temperature of 300° C. to 900° C.

In a preferred embodiment, the precursor solution to which the reducing agent is added contains the reducing agent in an amount of 0.01 to 5 M.

In a preferred embodiment, the reducing agent is any one selected from the group consisting of sodium borohydride, iron(ii) sulfate, lithium aluminum hydride, metal salts, and sulfur compounds.

In addition, the present disclosure provides a negative electrode for a lead storage battery and a Pb/C battery, including any one of the above-described negative electrode active materials and the negative electrode active material prepared by any one of the preparing methods.

In addition, the present disclosure provides a lead storage battery, including the above-described negative electrode.

In addition, the present disclosure also provides a Pb/C battery, including the above-described negative electrode.

The present disclosure described above has the following effects.

First, according to the negative electrode active material for a lead storage battery and a Pb/C battery of the present disclosure and a method for preparing the same, it is possible to effectively control the crystal size of lead sulfate generated during discharging of a lead storage battery and provide increased Faraday electrochemical performance.

Furthermore, in accordance with the negative electrode for a lead storage battery and a Pb/C battery and a lead storage battery and a Pb/C battery including the negative electrode of the present disclosure, the novel active material included in the present disclosure may realize a high-rate partial charge state (HRPSoC) and high-capacity performance during a long-term operation, further improve charge-discharge capacity performance, and provide a long-life performance.

These technical effects of the present disclosure are not limited to the scope above-mentioned, and may be recognized by those skilled in the art from specific descriptions for implementing the present disclosure even if not explicitly mentioned.

DETAILED DESCRIPTION

The terms used herein are used only to describe specific embodiments and are not intended to limit the present disclosure. The singular expression includes the plural expression unless the context clearly dictates otherwise. In this specification, the term "include" or "have" should be understood to designate that one or more of the described features, numbers, steps, operations, components, or a combination thereof exist, and the possibility of addition of one or more other features or numbers, operations, components, or combinations thereof should not be excluded in advance.

Terms such as first and second may be used to describe various elements, but the elements should not be limited by the terms. The above terms are used only for the purpose of distinguishing one component from another. For example, without departing from the scope of the present disclosure, a first component may be referred to as a second component, and similarly, the second component may also be referred to as a first component.

Unless defined otherwise, all terms used herein, including technical or scientific terms, have the same meaning as commonly understood by those of ordinary skilled in the art to which this disclosure belongs. Terms such as those defined in a generally used dictionary should be interpreted as having meanings consistent with those of the context of related technologies and are not interpreted as ideal or excessively formal meanings unless clearly defined in the present disclosure.

In interpreting the components, even if there is no explicit description, it is interpreted as including the error range. In particular, when the terms "about", "substantially", etc. of degree are used, they may be construed as being used in a sense at or close to the numerical value when manufacturing and material tolerances inherent in the stated meaning are presented.

In the case of description of the time relationship, for example, when the time-post relationship is described as "after", "and then", "thereafter", "before", etc., it includes cases where "right" or "direct" is not continuous unless used.

Hereinafter, the technical configuration of the present disclosure will be described in detail with reference to the accompanying drawings and preferred embodiments.

However, the present disclosure is not limited to the embodiments described herein, and reference numerals indicate like elements in different forms.

A technical feature of the present disclosure is a negative electrode active material for the lead storage battery, which can effectively control the crystal size of lead sulfate generated during discharge of a lead storage battery by improving the oxidation/reduction reversibility of lead sulfate and providing increased Faraday electrochemical performance, and a preparing method thereof.

That is when preparing a negative electrode active material for a lead storage battery, in which lead nanoparticles are introduced into micropores of carbon material by inserting the lead (Pb) precursor into the micropores of the porous carbon material support and reducing the lead precursor, the crystal size of lead sulfate ($PbSO_4$) is controlled during a lead storage battery discharge process, a Faraday electrochemical performance is provided due to improved electrochemical activity in an interface reaction between lead (Pb) nanoparticles and a carbon material support, thereby higher electrical conductivity and an electrochemical active surface area may be obtained due to the carbon material support structure introduced with nano-sized lead (Pb).

Therefore, in the negative electrode active material for the lead storage battery and Pb/C battery of the present disclosure, the negative electrode active material includes a porous carbon material with pores; and lead nanoparticles formed in the pores.

Here, the porous carbon material is not limited as long as it is a porous carbon material having an empty space therein but may be activated carbon or carbon nanotubes as an embodiment. As an embodiment, when the porous carbon material is activated carbon, a plurality of nano-sized and mesoscale pores is formed, the BET surface area may be 200 $m^2/g$ or more, and the total BET pore volume may be 0.1 to 2.0 $cm^3/g$. When the total BET pore volume is less than 0.1 $cm^3/g$, there is a problem in that it is difficult to prepare a high-capacity electrode material due to the low amount of metal oxide supported. When the total BET pore volume is more than 2.0 $cm^3/g$ since a large content of lead nanoparticles is formed on the surface of the porous carbon material, the lead nanoparticles are agglomerated to increase the size to greater than 1000 nm, and thus a problem caused by volume expansion may not be improved as the lead sulfate active material is converted into lead sulfate ($PbSO_4$) during a typical discharge process. As such, the coexistence of intermediate pores and fine pores in a porous carbon material is advantageous for large and fast ion transport and conductivity during the operation of a lead-acid battery having a negative electrode active material, including the porous carbon material and lead (Pb) nanoparticles formed in the inner pores thereof.

Lead nanoparticles are derived from a lead precursor such as $Pb(NO_3)_2$ and may be uniformly supported in pores of the porous carbon material or attached to an outer surface of the porous carbon material. The size of the lead nanoparticles supported inside the pores of the porous carbon material or formed on the surface is controlled by the size of the pores of the porous carbon material, the content of the lead precursor, and the treatment method, and is formed in a size of 1 to 1000 nm.

As described above, when the negative electrode active material includes a porous carbon material and lead nanoparticles formed inside the pores, and at the same time the size of the lead nanoparticles is formed to be less than 1000 nm, in the conventional discharge process that occurs in the anode of known lead-acid batteries and Pb/C batteries, the lead active material is converted to lead sulfate ($PbSO_4$), which causes volume expansion, which causes a decrease in lifespan, but prevents the formation of oxides of lead during nucleation and growth, thereby controlling the size of lead sulfate salt produced in the negative electrode. Therefore, it is possible to significantly improve the performance and lifespan of the battery by improving the oxidation/reduction reversibility of lead sulfate.

Therefore, the negative electrode active material for the lead storage battery and Pb/C battery of the present disclosure includes a porous carbon material and lead nanoparticles, and the porous carbon material and lead nanoparticles may be included in a weight ratio of 100:0 to 50:50. On the other hand, when the weight ratio of the porous carbon material to the lead nanoparticles is less than 90:10, the lead nanoparticles are not uniformly formed on the porous carbon material, so the capacity is low. When the weight ratio of the porous carbon material to the lead nanoparticles is more than 50:50, lead nanoparticles formed on the surface of the porous carbon material agglomerate and not only increase in size exceeding 1000 nm but also decrease homogeneity.

Next, a method for preparing a negative electrode active material for a lead storage battery and a Pb/C battery of the present disclosure, the method includes: preparing a carbon material dispersion solution by putting porous carbon material having multiple pores in a solvent and dispersing the same; impregnating the pores of the carbon material with a lead precursor by adding a lead precursor to the carbon material dispersion solution; obtaining a negative electrode active material by reducing the impregnated lead precursor to form lead nanoparticles in the pores of the carbon material; and washing and drying the negative electrode active material.

Preparing the carbon material dispersion solution may further include performing ultrasonic treatment with a stirrer in order to disperse the porous carbon material in a nano-size. Here, the porous carbon material may be activated carbon or carbon nanotubes, and in the case of activated carbon, the activated carbon is obtained by activating at a temperature of 100° C. to 3000° C. with any one among KOH, NaOH, and a combination thereof and then carbonizing it at a temperature of 300° C. to 900° C.

The impregnating includes: adding dropwise a certain amount of a lead precursor to the dispersion solution while primarily treating the carbon material dispersion solution with a stirrer and ultrasonic waves; and obtaining a precursor solution by secondarily treating the dispersion solution in which the lead precursor has been dropwise added with a stirrer and ultrasonic waves. Here, the lead precursor may be any one selected from the group consisting of lead nitrate ($Pb(NO_3)_2$), lead sulfate ($PbSO_4$), lead chloride ($PbCl_2$), lead acetate ($Pb(CH_3COO)_2$), lead chromate ($Pb(CrO_4)$), lead bromide ($PbBr_2$), and lead iodide ($PbI_2$). The lead precursor added dropwise to the dispersion solution may be dispersed in a nano-size through a stirrer and ultrasonic treatment to form a state in which the nano lead particles are supported in the pores of the porous carbon material. In addition, when the lead precursor is dispersed in a nano-size through a stirrer and ultrasonic treatment as described above, nano-lead particles may be formed mainly in the pores of the porous carbon material, and formation on the surface can be minimized by controlling the content of the lead precursor. Furthermore, even if lead particles are formed on the surface of the porous carbon material, it is possible to prevent the formation of lead oxide during nucleation and growth during discharge, unlike conventional negative electrode active materials, because they are formed into nano lead particles through a stirrer and ultrasonic treatment.

Obtaining the negative electrode active material includes: cooling the precursor solution obtained in the impregnation step to 0° C. to 10° C.; adding a reducing agent to the cooled precursor solution; heating and stirring the precursor solution to which the reducing agent is added; cooling the heated precursor solution to room temperature and then tertiarily treating the precursor solution with a stirrer and ultrasonic waves; and maintaining and fixing the precursor solution tertiarily treated with a stirrer and ultrasonic waves at room temperature for a certain period of time.

Here, the reducing agent may be any known reducing agent, but as an embodiment, it may be any one selected from the group consisting of sodium borohydride, iron(ii) sulfate, lithium aluminum hydride, metal salts, and sulfur compounds and may be included in the precursor solution at 0.01 to 5 M. Through the reduction process, an effect of preparing Pb nanoparticles having a uniform distribution, that is, preparing Pb nanoparticles having a uniform particle size can be obtained.

The fixing is performed at room temperature, atmospheric pressure, or vacuum conditions. When the fixing is performed under vacuum conditions, Pb particles are easily absorbed into the pores of the porous carbon material to increase electrochemical activity, and solvent removal is easy in the active material preparing process.

The negative electrode, including a negative electrode active material having the above-described configuration and the secondary battery to which the negative electrode is applied, provided a higher discharge capacity (1.938 Ah at 0.05 C rate) than conventionally known activated carbon having lead (Pb) particles. As such, the negative electrode active material having a novel hybrid structure of the present disclosure may control a lead sulfate generation size having a larger size, gives pseudocapacitance, and high electrical conductivity, reduces electrochemical reaction resistance, and provides synergistic effects such as efficient storage capacity performance.

Example 1

The following steps were performed to prepare a negative electrode active material. Each process was performed in an inert gas atmosphere to avoid contamination.
1. Preparing a Carbon Material Dispersion Solution 0.8 g of activated carbon, P-60 (Hanil Chemical, Korea), was added to a 3-neck round-bottom flask containing 100 ml of deionized water. Activated carbon uniformly dispersed in deionized water was treated with a stirrer and ultrasonic wave (40 kHz) for 10 minutes to prepare a carbon material dispersion solution.
2. Impregnating Lead nitrate ($Pb(NO_3)_2$) was added dropwise over 20 minutes during continuously primarily stirring and ultrasonic treatment at room temperature so that the supported amount was 10% by weight in the prepared carbon material dispersion solution. Then, the carbon material dispersion solution obtained by secondary stirring and ultrasonic treatment for 30 minutes was cooled to 5° C.
3. Obtaining a Negative Electrode Active Material 0.3 M $NaBH_4$ in 25 mL of deionized water was added dropwise to the carbon material dispersion solution. After the complete addition of the reducing agent, the solution was heated to 80° C. and stirred for 2 hours continuously. After cooling to room temperature, the solution was stirred and ultrasonic treated for 15 minutes. After that, the solution was kept stationary at room temperature for 12 hours.
4. Washing and Drying The solution was filtered, and the filtered solid material (a negative electrode active material) was washed several times with deionized water and ethanol and then dried in a hot air oven to obtain a negative electrode active material 1.

Figure 1:
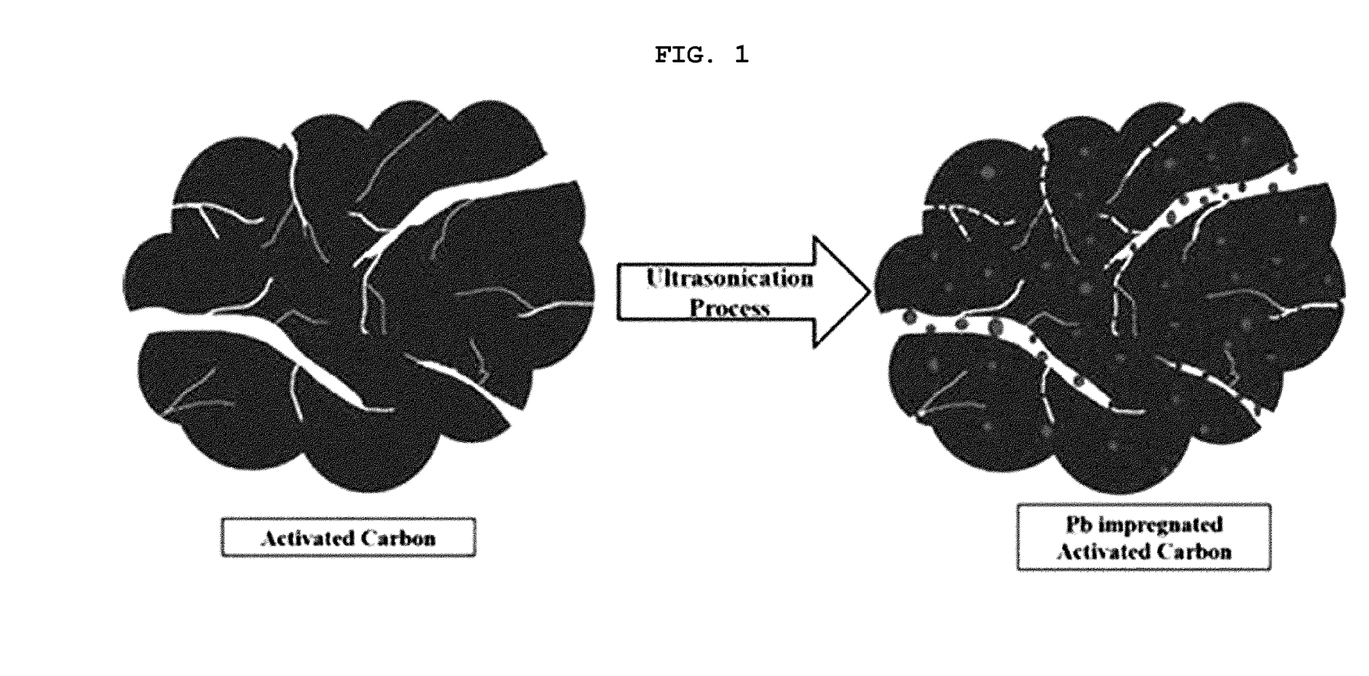
FIG. 1 shows a schematic diagram of a method for preparing a negative electrode active material for a lead storage battery and Pb/C battery according to an embodiment of the present disclosure.

Here, in the obtained negative electrode active material 1 (activated carbon-lead (Pb) from 10% ($Pb(NO_3)_2$)), lead (Pb) nanoparticles are inserted and formed in the micropores of activated carbon as shown in the schematic diagram in FIG. 1.

Example 2

A negative electrode active material 2 (activated carbon-lead (Pb) from 30% ($Pb(NO_3)_2$)) was obtained in the same manner as in Example 1, except that an appropriate amount of lead nitrate was adjusted to have a supported amount of 30% by weight in the impregnating.

Example 3

A negative electrode active material 3 (activated carbon-lead (Pb) from 50% ($Pb(NO_3)_2$)) was obtained in the same manner as in Example 1, except that an appropriate amount of lead nitrate was adjusted to have a supported amount of 50% by weight in the impregnating.

Experimental Example 1

Specific surface area (SSA) and pore volume analysis of negative active materials 1 to 3 obtained in Examples 1 to 3 were calculated by Brunauer-Emmett-Teller (BET) and Barrett-Joyner-Halenda (BJH) method (ASAP 2020) through nitrogen adsorption (adsorption/desorption) isotherms. The $N_2$ adsorption-desorption isotherm curves for the negative electrode active materials 1 to 3 are shown in FIG. 3A.

Figure 3A:
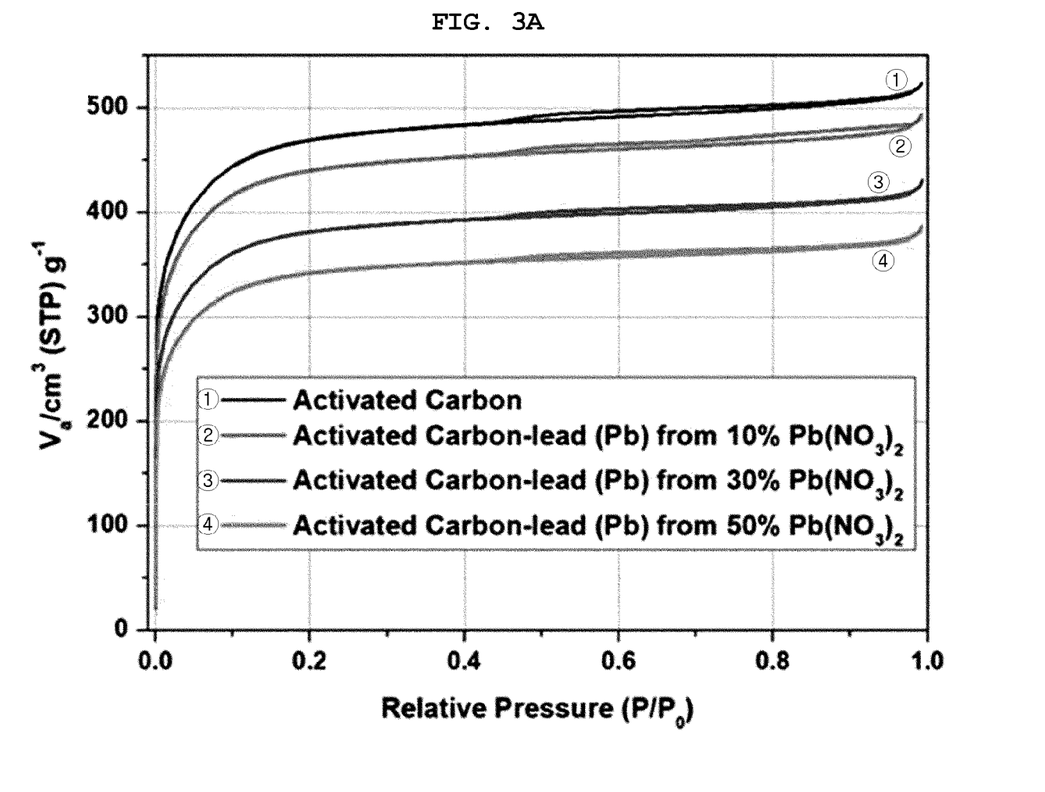
FIGS. 3A and 3B are graphs showing measurement results of specific surface area and pore size distribution of the negative electrode active material for the lead storage battery and Pb/C battery according to an embodiment of the present disclosure.

As shown in FIG. 3A, a hysteresis loop appeared for all negative electrode active materials. A specific surface area decreased in all negative electrode active materials, and when the contents of the lead (Pb) nanoparticles were 0 (activated carbon) and 10%, 30%, 50% by weight (negative electrode active materials 1 to 3), the specific surface area was 1787, 1669, 1445, and 1305 $m^2g^{-1}$, respectively. As such, the specific surface area of the active material continuously decreases as the lead content is increased by inserting lead (Pb) nanoparticles into the micropores of the activated carbon. This is because nano-sized lead (Pb) particles were successfully inserted into the carbon pores.

Experimental Example 2

Figure 3B:
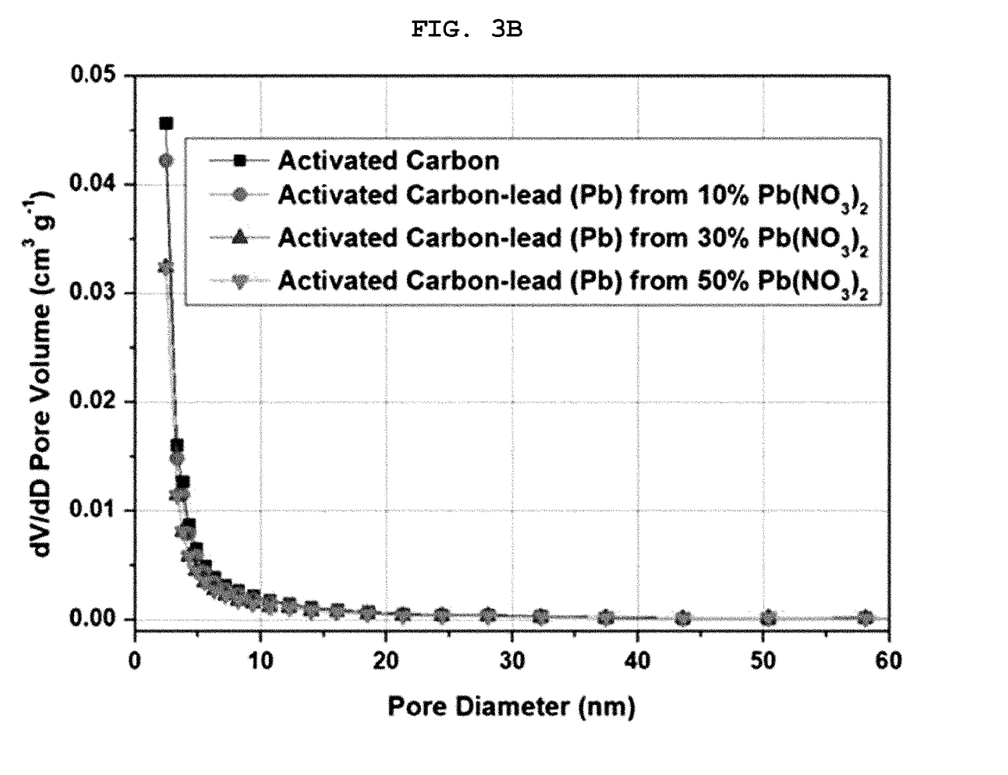

In order to determine whether lead (Pb) nanoparticles were supported and formed in the negative electrode active materials 1 to 3 obtained in Examples 1 to 3, the total pore volume was measured by BJH analysis, and the results are shown in FIG. 3B.

As shown in FIG. 3B, when the contents of the lead (Pb) nanoparticles were 0 (activated carbon) and 10%, 30%, 50% by weight (negative electrode active materials 1 to 3), the total pore volumes of the active material are 0.805, 0.759, 0.657, and 0.592 $cm^3g^{-1}$, respectively. In the process of synthesizing the negative electrode active material of the present disclosure, it can be seen that the pore volume of the activated carbon is continuously decreased because lead (Pb) nanoparticles are included in the pores.

Experimental Example 3

Figure 4:
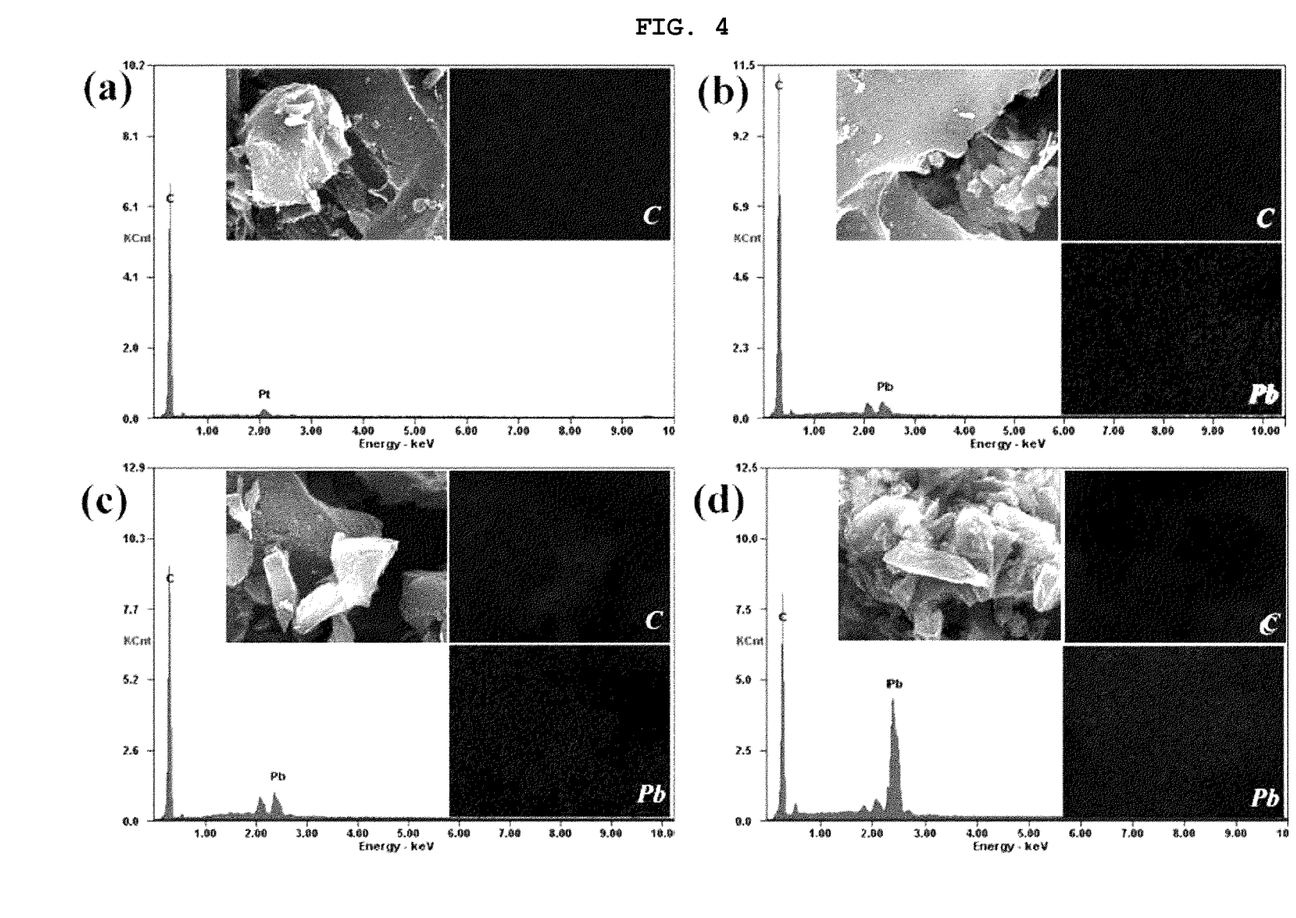
FIG. 4 is a graph showing a high-resolution scanning electron microscope (HR-SEM) and energy-dispersive X-ray spectroscopy (EDAX) of the negative electrode active material for the lead storage battery and Pb/C battery according to an embodiment of the present disclosure.

In order to determine whether lead (Pb) nanoparticles were supported and formed in the negative electrode active materials 1 to 3 obtained in Examples 1 to 3, a high-resolution scanning electron microscope (HR-SEM) (SU-70, HITACHI) and energy-dispersive X-ray spectroscopy (EDAX) were performed, and the results are shown in FIG. 4.

In FIG. 4, (a) shows SEM photos and EDAX results of activated carbon, and (b) to (d) shows SEM photos and EDAX results of the negative electrode active materials 1 to 3 obtained in Examples 1 to 3.

As shown in FIG. 4, a lead peak was observed in the EDAX results of negative electrode active materials 1 to 3 on which lead (Pb) nanoparticles were supported. In addition, it can be seen that the intensity of the Pb peak increases as the Pb content increases. As a result of synthesizing the negative electrode active material of the present disclosure, it can be seen that the lead loading was successful.

In addition, as shown in FIG. 4, as a result of EDAX mapping analysis, it can be observed that Pb nanoparticles are uniformly distributed and supported.

Experimental Example 4

Figure 5:
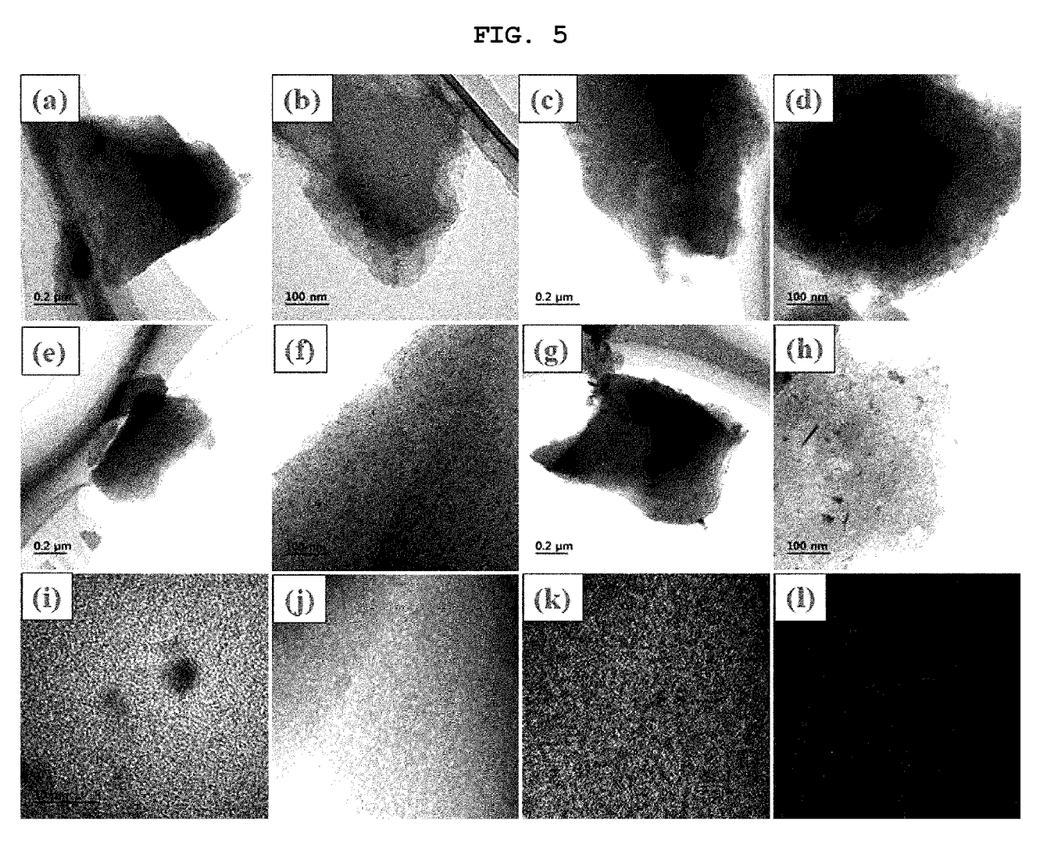
FIG. 5 are a TEM photograph (a to h), STEM image (j), and EDX mapping (k carbon, l lead) result photograph of a negative electrode active material for the lead storage battery and Pb/C battery according to an embodiment of the present disclosure.

A high-resolution transmission electron microscopy (HR-TEM), scanning transmission electron microscopy (STEM) (TECNAIF20, Phillips), and energy-dispersive X-ray spectroscopy (EDAX) are performed to confirm the particle size and the distribution of lead particles in the negative electrode active materials obtained in Examples 1 to 3, and the results are shown in FIG. 5.

In FIG. 5, (a) and (b) show a TEM micrograph of activated carbon. The microstructure of activated carbon showed a sheet-like shape, and it can be seen that it was composed of carbon nanosheets with a hollow microstructure.

In FIG. 5, (c) to (h) are TEM images of the negative electrode active materials 1 to 3, showing lead (Pb) nanoparticles uniformly distributed on a large surface of activated carbon and its pores. The Pb nanoparticles formed by being supported in the internal pores of activated carbon are in the nanoscale range (<5 nm) and have almost uniform sizes.

In FIG. 5, (i) is a high-magnification TEM image of the negative electrode active material 2, showing that the lead (Pb) nanoparticles are uniformly dispersed, and the particle size is less than 5 nm.

In FIG. 5, (j) to (l) show the results of EDX mapping analysis for further confirmation of the homogeneous dispersion of the lead active material of the negative electrode active material 2. Through this, it was confirmed that lead (Pb) nanoparticles were uniformly introduced into the activated carbon.

Examples 4 to 6

Negative electrodes 1 to 3 were prepared in the same manner except for changing the negative electrode active material 1 to 3 as follows.

Figure 2:
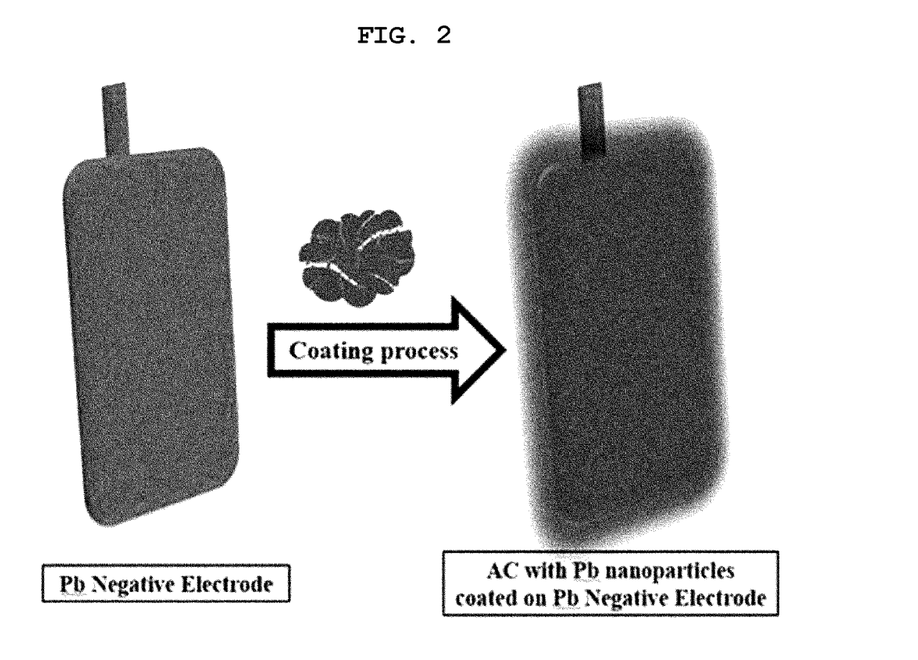
FIG. 2 shows a schematic diagram of a negative electrode for a Pb/C battery into which a negative electrode active material for the lead storage battery and Pb/C battery according to an embodiment of the present disclosure is introduced.

30% by weight of the negative electrode active materials 1 to 3 prepared in Examples 1 to 3, and 2% by weight of the binder were mixed with 68% by weight of deionized water. The mixed solution was coated on the Pb negative electrode as shown in FIG. 2 and dried at room temperature for 3 days to prepare negative electrodes 1 to 3.

Example 7

A lead storage battery 1 (activated carbon-Pb (derived from 10% ($Pb(NO_3)_2$)) was prepared by assembling two positive $PbO_2$ electrodes and one negative electrode 1 prepared in Example 4 as a negative electrode. At this time, the positive electrode and negative electrode were separated by absorbent glass fiber sheets (AGM). Dilute sulfuric acid ($H_2SO_4$, Sigma Aldrich, USA), having a specific gravity of 1.28, was used as the electrolyte.

Example 8

A lead storage battery 2 (activated carbon-Pb (derived from 30% ($Pb(NO_3)_2$)) was prepared in the same manner as in Example 7, except that the negative electrode 2 obtained in Example 5 was used as the negative electrode.

Example 9

A lead storage battery 3 (activated carbon-Pb (derived from 50% ($Pb(NO_3)_2$)) was prepared in the same manner as in Example 7, except that the negative electrode 3 obtained in Example 6 was used as the negative electrode.

Experimental Example 5

Figure 6:
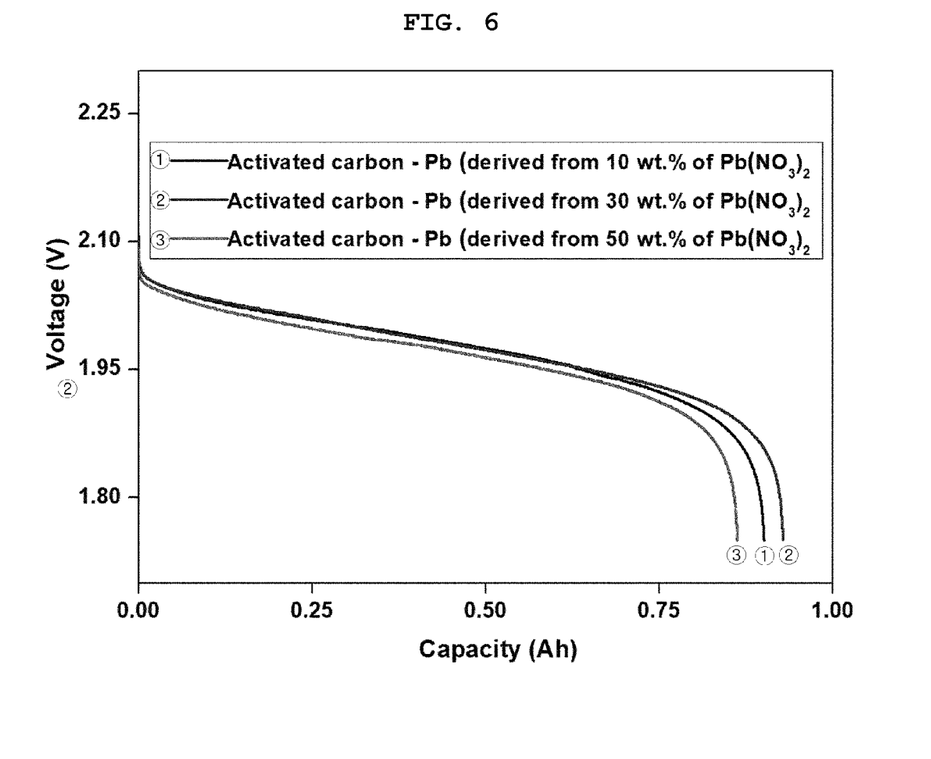
FIG. 6 is a graph showing the discharge performance characteristics at 1 C rate in the lead storage battery containing the negative electrode active material for the lead storage battery and Pb/C battery according to an embodiment of the present disclosure.

In order to optimize the introduction of lead (Pb) nanoparticles introduced into the inner pores of the porous carbon material in the anode active material of the present disclosure, discharge curves for the purpose of electrochemical characterization were observed for lead storage batteries 1 to 3 obtained in Examples 7 to 9, and the results are shown in FIG. 6. At this time, the lead storage batteries 1 to 3 were charged and discharged at 1 C rate. The charging and discharging performance of the lead storage battery was evaluated in a McScience battery tester Q101 by applying a constant electrical load.

As shown in FIG. 6, the battery discharge time according to the active material is different depending on the content of lead (Pb) nanoparticles supported on the activated carbon. That is, higher discharge performance was observed in the lead storage battery 2 using the negative electrode active material 2 with 30% by weight of lead (Pb) nanoparticles supported on activated carbon compared to lead storage battery 3 where negative electrode active material 1 with lead (Pb) nanoparticles supported in 10% by weight of activated carbon and negative electrode active material 3 with lead storage battery 50% by weight supported by lead storage battery 3. This is because the discharge capacities of the lead storage batteries 1 to 3 are 0.8395, 0.9601, and 0.8625 Ah at 1 C rate, respectively.

Experimental Example 6

For performance analysis of the negative electrode active material of the present disclosure, a negative electrode coated with activated carbon without Pb nanoparticles was compared and tested as follows. The performance test of the lead storage battery unit cell test compares and analyzes the discharge performance of the negative electrode coated with activated carbon and the lead storage battery 2 through the charging (2.33 V) and discharging (various C rates of 0.05, 0.1, 0.2, 0.5, and 1) processes. The results are shown in FIG. 7.

Figure 7:
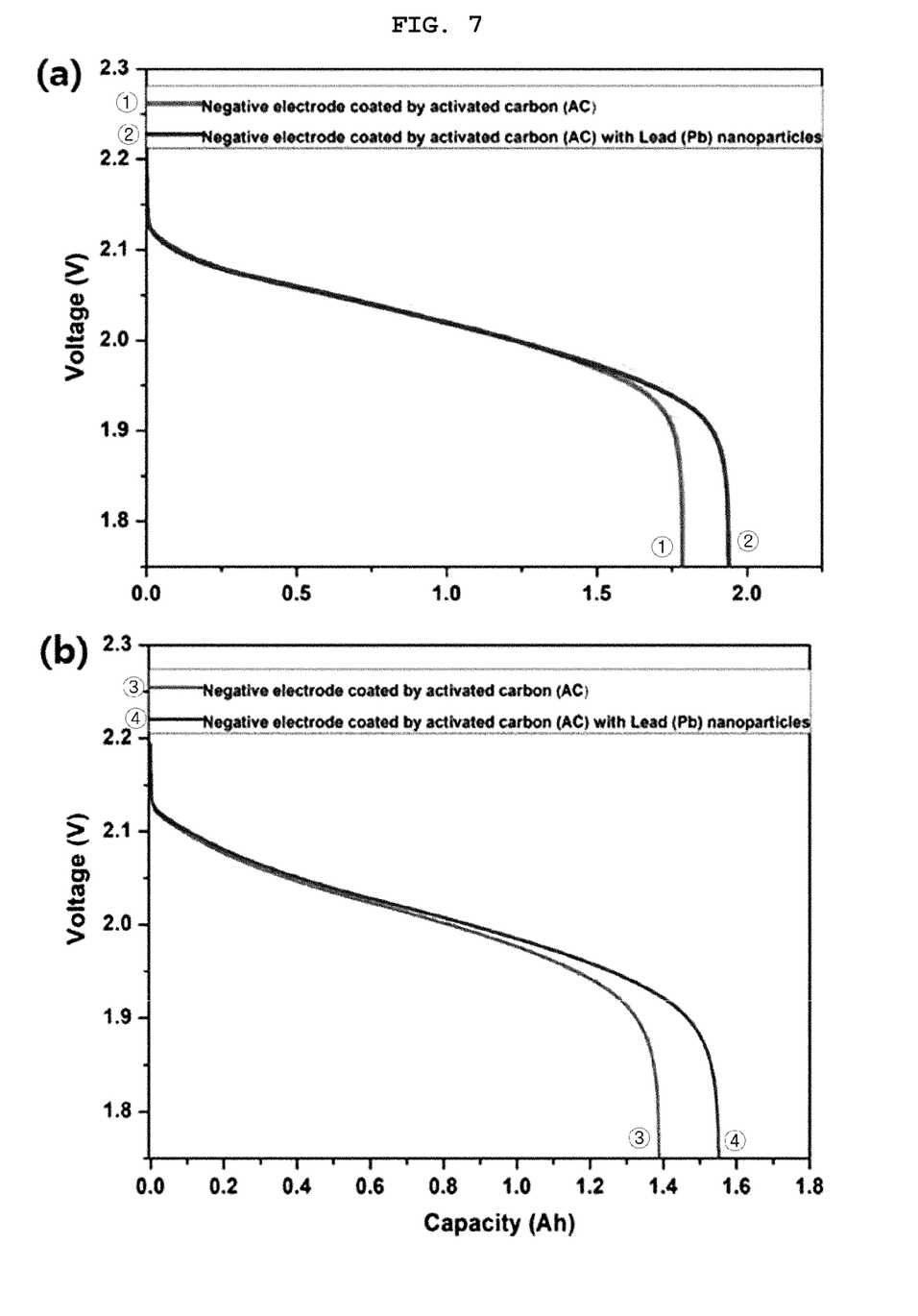
FIG. 7 is a graph showing performance comparison results at 0.05 and 0.1 C rates when the negative electrode active material for the lead storage battery, according to an embodiment of the present disclosure, is introduced, and activated carbon is introduced.

As shown in FIG. 7, it can be seen that the negative electrode coated with the negative electrode active material of the present disclosure provides a higher discharge capacity than the negative electrode coated with activated carbon. The discharge capacity of the battery to which the electrode coated with activated carbon was introduced was 1.783 Ah, and the battery assembled with the electrode to which the negative electrode active material of the present disclosure was introduced exhibited 1.938 Ah C-rate performance at 0.05 C rate. The higher the C-rate, the higher the discharge capacity was obtained in the negative electrode, including the negative electrode active material of the present disclosure.

Lead storage battery performance is directly related to the surface and porous properties of the electrode material. Therefore, as is evident from the above experimental results, the negative electrode active material of the present disclosure is formed by inserting Pb nanoparticles into the micropores of activated carbon through wet impregnation technology through ultrasonic treatment, and such a hybrid structure may operate as a large active site for electrochemical reaction related to initial performance, long-term stability, and the like during a lead storage battery performance implementation period, and thus may be a promising negative electrode material for a next-generation lead storage battery system.

Although the present disclosure is described with reference to the preferred embodiment as described above, the present disclosure is not limited thereto, and various changes and modifications may be made by those skilled in the art without departing from the spirit of the present disclosure.

What is claimed is:

1. A method of preparing a negative electrode active material for a Pb/C battery, the method comprising:
    preparing a carbon material dispersion solution by dispersing a porous carbon material having a plurality of pores in a solvent;
    impregnating the pores of the carbon material with a lead precursor by adding the lead precursor to the carbon material dispersion solution;
    obtaining a negative electrode active material by reducing the impregnated lead precursor to form lead nanoparticles in pores of the carbon material; and
    washing and drying the negative electrode active material.

2. The method of claim 1, wherein the impregnating comprises:
    adding dropwise a predetermined amount of the lead precursor to the carbon material dispersion solution while primarily treating the carbon material dispersion solution with a stirrer and ultrasonic waves; and
    obtaining a precursor solution by secondarily treating the dispersion solution having undergone the dropwise addition of the lead precursor, with a stirrer and ultrasonic waves.

3. The method of claim 1, wherein the obtaining of the negative electrode active material comprises:
    cooling the precursor solution obtained in the impregnation step to 0° C. to 10° C.;
    adding a reducing agent to the cooled precursor solution; heating and stirring the precursor solution to which the reducing agent is added;
    cooling the heated precursor solution to room temperature and then tertiarily treating the precursor solution with a stirrer and ultrasonic waves; and
    maintaining and fixing the precursor solution tertiarily treated with a stirrer and ultrasonic waves at room temperature for a certain period of time.

4. The method of claim 3, wherein the fixing is performed at room temperature and atmospheric or vacuum pressure.

5. The method of claim 1, wherein the lead precursor is any one selected from the group consisting of lead nitrate ($Pb(NO_3)_2$), lead sulfate ($PbSO_4$), lead chloride ($PbCl_2$), lead acetate ($Pb(CH_3COO)_2$), lead chromate ($Pb(CrO_4)$), lead bromide ($PbBr_2$), and lead iodide ($PbI_2$).

6. The method of claim 1, wherein the porous carbon material is activated carbon or carbon nanotubes obtained by activating a raw material with KOH, NaOH, or both at a temperature of 100° C. to 3000° C. and then carbonizing the activated raw material at a temperature of 300° C. to 900° C.

7. The method of claim 3, wherein the precursor solution to which the reducing agent is added contains the reducing agent in an amount of 0.01 to 5 M.

8. The method of claim 7, wherein the reducing agent is any one selected from the group consisting of sodium borohydride, iron (ii) sulfate, lithium aluminum hydride, metal salts, and sulfur compounds.

9. A negative electrode for a Pb/C battery, the negative electrode active material prepared by the method of claim 1.

10. A Pb/C battery comprising the negative electrode of claim 9.

\* \* \* \* \*